United States Patent [19]

Blickle et al.

[11] Patent Number: 4,933,388
[45] Date of Patent: Jun. 12, 1990

[54] SOLUTIONS OF COPOLYMERS OF THE TETRAFLUOROETHYLENE/ETHYLENE TYPE

[75] Inventors: Peter Blickle, Taunus; Friedhelm Gundert, Liederbach; Klaus Hintzer; Gernot Löhr, both of Burgkirchen; Werner Schwertfeger, Langgöns, all of Fed. Rep. of Germany

[73] Assignee: Hoechst Aktiengesellschaft, Frankfurt, Fed. Rep. of Germany

[21] Appl. No.: 290,360

[22] Filed: Dec. 27, 1988

[30] Foreign Application Priority Data

Dec. 29, 1987 [DE] Fed. Rep. of Germany ....... 3744392

[51] Int. Cl.$^5$ ................................................. C08K 5/02
[52] U.S. Cl. .................................... 524/462; 524/520; 524/546; 524/585; 524/851
[58] Field of Search ................ 524/462, 520, 546, 851

[56] References Cited

U.S. PATENT DOCUMENTS 2,412,960 12/1946 Berry .
2,448,952 9/1948 Berry .
2,484,483 10/1949 Berry .
3,528,954 9/1970 Carlson ................................ 526/206
4,298,697 11/1981 Baczek et al. ......................... 521/27

FOREIGN PATENT DOCUMENTS 1089723 11/1967 United Kingdom ................ 524/462
1355595 7/1972 United Kingdom .
81-01158 4/1981 World Int. Prop. O. .

OTHER PUBLICATIONS

Encyclopedia of Polymer Science and Technology Supplemental Vol. I, p. 274. (1976).

Primary Examiner—Joseph L. Schofer
Assistant Examiner—Mark D. Sweet

[57] ABSTRACT

Solutions of copolymers of the tetrafluoroethylene/ethylene type

Copolymer solutions comprising tetrafluoroethylene, ethylene and, as appropriate, further α-olefinic monomers in low-molecular-weight polymers of chlorotrifluoroethylene are described. They can be used for coatings, impregnations, cast films and for the production of fibers and filaments by gel spinning.

6 Claims, No Drawings

SOLUTIONS OF COPOLYMERS OF THE TETRAFLUOROETHYLENE/ETHYLENE TYPE

DESCRIPTION

The invention relates to copolymer solutions comprising (a) at most of 60 mol-% of copolymerized units of tetrafluoroethylene (TFE),
(b) 60 to 40 mol-% of copolymerized units of ethylene (E) and
(c) 0 to 15 mol-% of copolymerized units of at least one further α-olefinic monomer.

Such copolymers are called copolymers of the TFE/E type below.

In contrast to polytetrafluoroethylene, copolymers of this type can be processed from the melt to form moldings. However, these copolymers share with polytetrafluoroethylene resistance to chemicals and solvents. There is therefore no solvent known which is capable of dissolving copolymers of the TFE/E type to a notable extent below 200° C. Even for the range 200° C. upwards, however, the number of available solvents is very low. They are limited to high-boiling esters of carboxylic acids and dicarboxylic acids and to high-boiling cyclic and aromatic ketones. Such solutions are known from U.S. Pat. Nos. 2,412,960, 2,448,952 and 2,484,483. The solvents mentioned have at least one of the following disadvantages:

they decompose at the high temperature of >200° C. necessary for the dissolution process;
their decomposition products result in discoloration on heating in order to remove the solvent from the copolymer;
these decomposition products can only be removed from the solutions with difficulty or not at all and thus impair the properties of articles produced from these solutions;
they dissolve certain copolymers of the TFE/E type very poorly or not at all.

PCT Offenlegungsschrift 81/01,158 furthermore discloses that perfluorinated copolymers containing ion exchanger groups (sulfonyl or carboxyl groups) can be dissolved, inter alia, in low-molecular-weight oligomers or telomers of chlorotrifluoroethylene for further processing. Such copolymers containing functional groups are known to those skilled in the art as readily soluble in a wide variety of solvents. This permits no conclusions on extremely sparingly soluble copolymers, such as those of the TFE/E type.

In order to avoid the abovementioned disadvantages, the present invention provides solutions of the copolymers mentioned in the introduction which contain, as solvents, low-molecular-weight polymers of chlorotrifluoroethylene of an oily or waxy consistency having a boiling point of from 150° to 350° C. and a melting point of ≦80° C.

The solvents employed are preferably low-molecular-weight polymers of chlorotrifluoroethylene of an oily consistency having a boiling point of from 210° to 300° C.

These low-molecular-weight polymers employed as solvents are oligomers or telomers of polychlorotrifluoroethylene. They have the consistency of oils having relatively high boiling points of 150° to 350° C., preferably 210° to 300° C. (in each case at atmospheric pressure), or of low-melting waxes having a melting point of ≦80° C., preferably ≦50° C.. Short-chain, low-molecular-weight polymers of this type are obtained either by chain degradation or chain buildup. The former is the well-known pyrolysis of polychlorotrifluoroethylene, as described, for example, in U.S. Pat. Nos. 2,854,490 and 2,969,403. Chain build-up to low-molecular-weight polymers can take place by telomerization of chlorotrifluoroethylene in the presence of telogens, such as, for example, chloroform, chlorofluoroalkanes, chlorofluoroalkyl iodides, chlorofluoroalkyl bromides and the like, as described, for example, in British Patent No. 927,403 or in U.S. Pat. Nos. 2,694,701, 2,700,661, 2,875,253 and 2,922,824. Finally, such oligomers are also successfully prepared by polymerizing chlorotrifluoroethylene under certain controlled conditions, for example in the presence of certain peroxides. Such processes are known, inter alia, from U.S. Pat. No. 2,705,706 and British Patent No. 796,326.

Fluorochlorocarbon oils are also known as commercial products under the trade name "®Halocarbon Oils" from Messrs. Halocarbon Products Corp., Hackensack, N.J., USA, and under the trade name "®Fluorolube" from Messrs. Hooker Chemical Corp., Niagara Falls, USA.

The solutions are prepared in a customary and known manner by dissolving the copolymer at elevated temperatures of from ≧150° C. to the boiling point of the solvent, preferably at temperatures of from 100° to 10° C. below the boiling point of the particular solvent. If necessary, slightly elevated pressure can be used, for example in order to avoid excessive loss of solvent in the region of the boiling point. However, the dissolution is preferably carried out at atmospheric pressure. If the solvents are solids which have a waxy consistency at room temperature, it is expedient to convert the latter into the liquid state by warming before dissolving the copolymer. The dissolution is expediently carried out with mechanical mixing, such as stirring, shaking and the like, where the copolymer should as far as possible be in finely divided or finely comminuted form. The concentration of the solutions obtained extends (from 0.05) to 30% by weight of the copolymer. In the case of a fine distribution, the dissolution process proceeds rapidly. It is also possible to dissolve coarser distribution forms, for example melt granules, but the dissolution process takes longer here. On cooling to room temperature, the low-viscosity solution becomes a high-viscosity gel which is no longer capable of flowing; in the case of chlorotrifluoroethylene polymers which are waxy at room temperature, solidification occurs. This gelling or solidification process is entirely reversible.

The low-molecular-weight chlorotrifluoroethylene polymers employed as solvents can be removed from the molded product by evaporation, expediently under reduced pressure, or by extraction with organic solvents, such as, for example, low-boiling alkanes or chlorofluorocarbons or chlorofluorohydrocarbons.

Copolymers of the TFE/E type dissolved according to the invention are taken to mean those which (a) contain at most of 60 (and at least 30) mol-% of copolymerized units of tetrafluoroethylene, and
(b) 60 to 40 mol-% of copolymerized units of ethylene, and
(c) in addition 0 to 15 mol-%, preferably up to 8 mol-%, of at least one further α-olefinic comonomer, the lower limit for the content of a monomer or further monomers of this type being 0.05 mol-%, preferably 0.5 mol-%, if one or more further monomers of this type are optionally present, i.e. terpolymers and quaterpolymers or copolymers of even higher order are present. The terpolymers can contain, besides ethylene and tetrafluoroethylene, the following α-olefinic monomers in the proportions mentioned:

($c_1$) perfluorinated olefins of the formula $CF_2=CF-Rf_1$ in which $Rf_1$ is a perfluroalkyl radical having 1 to 10, preferably 1 to 5, carbon atoms, and is preferably, in particular, hexafluoropropylene (HFP);

($c_2$) perfluorinated vinyl ethers of the formula $CF_2=CF-O-Rf_2$ in which $Rf_2$ is a perfluoroalkyl radical having 1 to 10, preferably 1 to 4, carbon atoms. The perfluoroethyl, perfluoro-n-butyl and, in particular, the perfluoro-n-propyl radicals (PPVE) may be mentioned;

($c_3$) perfluorinated vinyl ethers of the formula

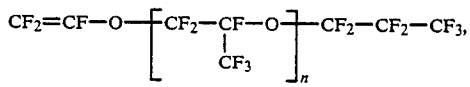

in which n is 1 to 4, preferably 1 or 2;

($c_4$) perfluorinated vinyl ethers of the formula

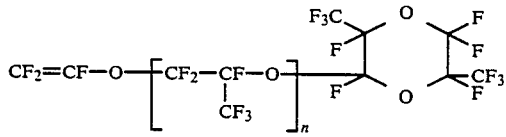

in which n is 0 to 1, preferably 0;

($c_5$) perfluoro-2-methylene-4-methyl-1,3-dioxolane;

($c_6$) perfluorinated vinyl ethers of the general formula $CF_2=CF-O-(CF_2)n-COX_1$ in which $X_1$ represents OH, $OR_1$ or $NR_2R_3$, and where $R_1$ is an alkyl group having 1 to 3 carbon atoms, and $R_2$ and $R_3$ each represent a hydrogen atom or $R_1$, and n denotes a number from 1 to 10;

($c_7$) fluorinated vinyl ethers of the formula

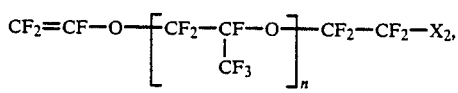

in which $X_2$ represents $COOR_4$, COOH or CN, $R_4$ denotes an alkyl group having 1 to 3 carbon atoms, and n denotes an integer from 1 to 4;

($c_8$) perfluoroalkyl-substituted vinyl compounds of the formula $CH_2=CH-Rf_3$ in which $Rf_3$ is a perfluoroalkyl radical having 2 to 10, preferably 2 to 6 carbon atoms;

($c_9$) fluorine-containing olefins of the formula $CH_2=CRf_4-Rf_3$ in which $Rf_4=F$ or $CF_3$ and $Rf_3$ is a perfluoroalkyl radical having 1 to 10, preferably 1 to 6, carbon atoms, in particular 3,3,3-trifluoro-2-trifluoromethylpropylene;

($c_{10}$) 1,1,1-trifluoro-2-(trifluoromethyl)-4-penten-2-ol

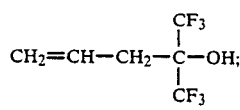

($c_{11}$) allyl 1-hydroxyhexafluoroisopropyl ether

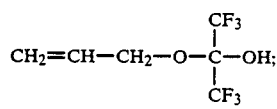

($c_{12}$) compounds of the general formula $CH_2=CH-(CH_2)n-O-CF_2-CFX_3H$ in which $X_3 =F$, Cl or trifluoromethyl, preferably F, and n is zero or 1;

($c_{13}$) allyl or methallyl esters of the formula $CH_2=CR_5-CH_2-O-CO-R_6$ in which $R_5=H$ or $CH_3$ and $R_6$ is an alkyl radical having 1 to 3 carbon atoms, preferably a methyl radical;

($c_{14}$) vinyl esters of the general formula $CH_2=CH-O-CO-R_7$ in which $R_7$ is an alkyl radical having 1 to 3 carbon atoms, preferably a methyl radical;

($c_{15}$) α-olefins having 3 to 4 carbon atoms, preferably isobutylene;

($c_{16}$) acrylates and methacrylates, preferably methyl to butyl esters thereof;

($c_{17}$) vinylidene fluoride, and ($c_{18}$) trifluorochloroethylene.

Preferred termonomers (besides tetrafluoroethylene and ethylene) in these terpolymers are the abovementioned monomers of groups ($c_1$), ($c_2$), ($c_3$), ($c_4$), ($c_9$), ($c_{12}$), ($c_{14}$) and ($c_{18}$), and of these, in particular their representatives mentioned as being preferred.

The copolymers dissolved according to the invention may also be quaterpolymers or copolymers of even higher order, containing in the mixture two or more of the monomers mentioned under ($c_1$) to ($c_{18}$). Quaterpolymers which, besides tetrafluoroethylene/ethylene/hexafluoropropylene, also contain a monomer from the abovementioned groups ($c_1$) to ($c_{18}$), are preferred, in particular perfluoro(propyl vinyl) ether.

The copolymers made from only TFE/E have been known for a long time from U.S. Pat. No. 2,468,664. Terpolymers of the abovementioned types are described in U.S. Pat. Nos. 2,468,664, 3,817,951, 3,960,825, 3,624,250, 3,450,684, 4,013,689, 4,166,165, 4,138,426, 4,123,602, 3,847,881, 2,975,161, 3,380,971 and 3,303,154 and in British patent No. 1,355,595. The quaterpolymers mentioned are described, for example, in U.S. Pat. No. 4,381,387. They comprise 55 to 30 mol-%, preferably 55 to 40 mol-%, of copolymerized units of tetrafluoroethylene, 60 to 40 mol-%, preferably 55 to 45 mol-%, of copolymerized units of ethylene, 10 to 1.5 mol-%, preferably 8 to 3 mol-% and in particular 5 to 3 mol-%, of copolymerized units of hexafluoropropylene, and 2.5 to 0.05 mol-%, preferably 1 to 0.1 mol-% and in particular 0.8 to 0.2 mol-%, of copolymerized units of further monomers from the abovementioned groups ($c_1$) to ($c_{18}$), the 4 components in each case adding up to 100 mol-%.

The solutions according to the invention are used for the production of casting films. In this case, the solutions are cast at elevated temperatures onto a substrate, expediently a hot substrate. The solvent is evaporated or removed by applying a vacuum. After removal from the substrate, a self-supporting, substantially transparent film results.

Furthermore, coatings and impregnations can be produced from such solutions, the coating process being the same as for the production of casting films. Suitable processes are those such as hot spraying, dipping and the like.

It is thus possible to coat networks, woven fabrics, nonwoven fabrics, surfaces made from porous materials such as sintered metals or ceramics or alternatively metallic substrates. In the latter case, it is expedient to previously apply adhesion-promoting layers. These solutions can also be employed for repair of holes, cracks etc. in films made from copolymers of the TFE/E type.

In particular, these solutions are used for so-called gel spinning and thus render the copolymers of the TFE/E type. accessible to this process and open up the possibility for the production of high-strength fibers and filaments made from these materials. Finally, more accurate determination of physical properties (molecular weight, light scattering and structure) is possible on such solutions.

The invention is described by the examples below:

EXAMPLES 1 to 6

47.5 g (Example 1 48.2 g) of a low-molecular-weight chlorotrifluoroethylene polymer (®Halocarbon Oil 27 S from Messrs. Halocarbon Products) having a boiling range of from 270° to 290° C. as solvent and 2.5 g (Example 1 1.8 g) of the particular, previously ground copolymer powder in a 100 ml three-neck flask are heated in an oil bath with stirring and under a blanket of nitrogen to a temperature between 250° and 260° C. (temperature of the oil bath 260° to 270° C.). At the dissolution temperature of 240° to 250° C., a high-viscosity swelling product is initially produced; its viscosity decreases again in the further course of the dissolution process as far as complete homogenization. The viscosities of the homogenized solutions at a temperature of 260° C., measured using a RV 20 rotary viscosimeter fitted with an ME 500 high-temperature measuring device, from Messrs. Haake, Karlsruhe, Federal Republic of Germany, are given in the table below:

| Example | Comonomers in the copolymer [mol-%] | | | | Conc. [% by weight] | Zero-shear viscosity [Pa s] |
|---|---|---|---|---|---|---|
| | TFE | E | HFP | PPVE | | |
| 1 | 50 | 50 | — | — | 3.6 | 43 |
| 2 | 49.0 | 49.8 | — | 1.2 | 5 | 3.6 |
| 3 | 50.0 | 49.4 | — | 0.6 | 5 | 3.6 |
| 4 | 48.0 | 47.8 | 4.2 | — | 5 | 2.9 |
| 5 | 49.0 | 45.8 | 5.2 | — | 5 | 8.7 |
| 6 | 48.0 | 47.0 | 1.6 | 3.4 | 5 | 50 |

On cooling to room temperature, all these solutions solidify to form gels which are not capable of flowing. However, this process can be made completely reversible again by heating.

EXAMPLE 7

10 g of a copolymer containing, of copolymerized units, 48 mol-% of TFE, 42 mol-% of E and 10 mol-% of HFP and having a melt flow index of 56, measured at 300° C. and a load of 11 kg, are stirred for 4 hours at 165° C. in 100 g of a low-molecular-weight chlorotrifluoroethylene polymer (®Halocarbon Oil 6.3 S) having a boiling range of from 220° to 240° C. A completely clear, slightly viscous solution is obtained. The solution is poured onto a hot glass plate, and, after distribution, the solvent is evaporated while hot and under reduced pressure (15 mbar). A smooth, transparent, self-supporting cast film is obtained.

EXAMPLE 8

15 g of a copolymer containing, of copolymerized units, 48 mol-% of TFE, 48 mol-% of E and 4 mol-% of HFP, and having a melt flow index of 35, measured at 300° C. and a load of 11 kg, are stirred for 5 hours at 230° C. in 100 g of a low-molecular-weight chlorotrifluoroethylene polymer (®Halocarbon Oil 27 S from Messrs. Halocarbon Products) having a boiling range of from 270° to 290° C. An absolutely clear, colorless, viscous solution is obtained. A woven fabric comprising fibers of a copolymer made from tetrafluoroethylene and hexafluoropropylene is coated with this solution. After evaporation of the solvent while hot and under reduced pressure (15 mbar), a pore-free coated fabric is obtained.

What is claimed is:

1. A copolymer solution having a solute comprising:
   (a) at least 30 mol-% and at most 60 mol-% of copolymerized units of tetrafluoroethylene;
   (b) 60 to 40 mol-% of copolymerized units of ethylene; and
   (c) 0.05 to 15 mol-% copolymerized units of at least one further α-olefinic monomer selected from hexafluoropropylene, perfluoro(propylvinyl) ether or mixtures thereof, said solute being dissolved in a high boiling, low molecular-weight chlorotrifluoroethylene polymer solvent having an oily or waxy consistency and having a boiling point ranging from 150° to 350° C. and a melting point of $\leq 80°$ C.

2. The copolymer solution as claimed in claim 1, wherein said low-molecular-weight chlorotrifluoroethylene polymer solvent has a boiling point ranging from 210° to 300° C.

3. The copolymer solution as claimed in claim 1, wherein said low-molecular-weight cholorotrifluoroethylene polymer solvent has a melting point of $\leq 50°$ C.

4. The copolymer solution of claim 1, wherein said α-olefinic monomer is present at a concentration of up to 8 mol-%.

5. The copolymer solution of claim 1, wherein said α-olefinic monomer is present at a concentration of at least 0.5 mol-%.

6. The copolymer solution of claim 1, wherein the concentration of said solute ranges from 0.05 to 30% by weight of said solute in said solution.

* * * * *